United States Patent
Kumar et al.

(10) Patent No.: US 10,355,996 B2
(45) Date of Patent: *Jul. 16, 2019

(54) HETEROGENEOUS CHANNEL CAPACITIES IN AN INTERCONNECT

(71) Applicant: NetSpeed Systems, San Jose, CA (US)

(72) Inventors: Sailesh Kumar, San Jose, CA (US); Joji Philip, San Jose, CA (US); Eric Norige, East Lansing, MI (US); Sundari Mitra, Saratoga, CA (US)

(*) Notice: Subject to any disclaimer, the term of this patent is extended or adjusted under 35 U.S.C. 154(b) by 1032 days.

This patent is subject to a terminal disclaimer.

(21) Appl. No.: 14/519,639

(22) Filed: Oct. 21, 2014

(65) Prior Publication Data

US 2017/0063693 A1 Mar. 2, 2017

Related U.S. Application Data

(63) Continuation of application No. 13/647,557, filed on Oct. 9, 2012, now Pat. No. 8,885,510.

(51) Int. Cl.
*H04L 12/26* (2006.01)
*H04L 12/803* (2013.01)
*H04L 12/933* (2013.01)

(52) U.S. Cl.
CPC .......... *H04L 47/122* (2013.01); *H04L 43/062* (2013.01); *H04L 49/109* (2013.01)

(58) Field of Classification Search
CPC . H04W 72/04; H04W 40/00; H04W 72/0406; H04L 45/125; H04L 5/0035; H04L 5/0055; H04L 5/0057; H04L 12/2869; H04L 12/5695; H04L 47/00; H04L 47/70; H04L 47/78; H04L 47/821; H04L 47/827
See application file for complete search history.

(56) References Cited

U.S. PATENT DOCUMENTS

| | | |
|---|---|---|
| 4,409,838 A | 10/1983 | Schomberg |
| 4,933,933 A | 6/1990 | Dally et al. |
| 5,105,424 A | 4/1992 | Flaig et al. |
| 5,163,016 A | 11/1992 | Har'El et al. |

(Continued)

FOREIGN PATENT DOCUMENTS

| | | |
|---|---|---|
| CN | 103684961 A | 3/2014 |
| JP | 5936793 | 5/2016 |

(Continued)

OTHER PUBLICATIONS

Abts, D., et al., Age-Based Packet Arbitration in Large-Radix k-ary n-cubes, Supercomputing 2007 (SC07), Nov. 10-16, 2007, 11 pgs.

(Continued)

*Primary Examiner* — Jung Liu
(74) *Attorney, Agent, or Firm* — Spectrum IP Law Group LLC

(57) ABSTRACT

Systems and methods involving construction of a system interconnect in which different channels have different widths in numbers of bits. Example processes to construct such a heterogeneous channel NoC interconnect are disclosed herein, wherein the channel width may be determined based upon the provided specification of bandwidth and latency between various components of the system.

17 Claims, 11 Drawing Sheets

(56) References Cited

U.S. PATENT DOCUMENTS

| | | | |
|---|---|---|---|
| 5,355,455 A | 10/1994 | Hilgendorf et al. | |
| 5,432,785 A * | 7/1995 | Ahmed | H04L 12/5602 370/231 |
| 5,563,003 A | 10/1996 | Suzuki et al. | |
| 5,583,990 A | 12/1996 | Birrittella et al. | |
| 5,588,152 A | 12/1996 | Dapp et al. | |
| 5,764,740 A * | 6/1998 | Holender | H04Q 3/0062 379/112.01 |
| 5,764,741 A | 6/1998 | Holender | |
| 5,859,981 A | 1/1999 | Levin et al. | |
| 5,991,308 A * | 11/1999 | Fuhrmann | H03M 13/256 348/E7.07 |
| 6,003,029 A | 12/1999 | Agrawal et al. | |
| 6,029,220 A | 2/2000 | Iwamura et al. | |
| 6,058,385 A | 5/2000 | Koza et al. | |
| 6,101,181 A | 8/2000 | Passint et al. | |
| 6,108,739 A | 8/2000 | James et al. | |
| 6,249,902 B1 | 6/2001 | Igusa et al. | |
| 6,314,487 B1 | 11/2001 | Hahn et al. | |
| 6,377,543 B1 * | 4/2002 | Grover | H04L 41/046 370/227 |
| 6,415,282 B1 | 7/2002 | Mukherjea et al. | |
| 6,674,720 B1 | 1/2004 | Passint et al. | |
| 6,711,717 B2 | 3/2004 | Nystrom et al. | |
| 6,925,627 B1 | 8/2005 | Longway et al. | |
| 6,967,926 B1 | 11/2005 | Williams, Jr. et al. | |
| 6,983,461 B2 | 1/2006 | Hutchison et al. | |
| 7,046,633 B2 | 5/2006 | Carvey | |
| 7,065,730 B2 | 6/2006 | Alpert et al. | |
| 7,143,221 B2 | 11/2006 | Bruce et al. | |
| 7,318,214 B1 | 1/2008 | Prasad et al. | |
| 7,379,424 B1 | 5/2008 | Krueger | |
| 7,437,518 B2 | 10/2008 | Tsien | |
| 7,461,236 B1 | 12/2008 | Wentzlaff | |
| 7,509,619 B1 | 3/2009 | Miller et al. | |
| 7,564,865 B2 | 7/2009 | Radulescu | |
| 7,583,602 B2 * | 9/2009 | Bejerano | H04W 40/10 370/238 |
| 7,590,959 B2 | 9/2009 | Tanaka | |
| 7,693,064 B2 | 4/2010 | Thubert et al. | |
| 7,701,252 B1 | 4/2010 | Chow et al. | |
| 7,724,735 B2 | 5/2010 | Locatelli et al. | |
| 7,725,859 B1 | 5/2010 | Lenahan et al. | |
| 7,774,783 B2 | 8/2010 | Toader | |
| 7,808,968 B1 | 10/2010 | Kalmanek, Jr. et al. | |
| 7,853,774 B1 | 12/2010 | Wentzlaff | |
| 7,917,885 B2 | 3/2011 | Becker | |
| 7,957,381 B2 | 6/2011 | Clermidy et al. | |
| 7,973,804 B2 | 7/2011 | Mejdrich et al. | |
| 8,018,249 B2 | 9/2011 | Koch et al. | |
| 8,020,163 B2 | 9/2011 | Nollet et al. | |
| 8,020,168 B2 | 9/2011 | Hoover et al. | |
| 8,050,256 B1 | 11/2011 | Bao et al. | |
| 8,059,551 B2 | 11/2011 | Milliken | |
| 8,099,757 B2 | 1/2012 | Riedle et al. | |
| 8,136,071 B2 | 3/2012 | Solomon | |
| 8,203,938 B2 | 6/2012 | Gibbings | |
| 8,261,025 B2 | 9/2012 | Mejdrich et al. | |
| 8,281,297 B2 | 10/2012 | Dasu et al. | |
| 8,306,042 B1 | 11/2012 | Abts | |
| 8,312,402 B1 | 11/2012 | Okhmatovski et al. | |
| 8,352,774 B2 | 1/2013 | Elrabaa | |
| 8,407,425 B2 | 3/2013 | Gueron et al. | |
| 8,412,795 B2 | 4/2013 | Mangano et al. | |
| 8,438,578 B2 | 5/2013 | Hoover et al. | |
| 8,448,102 B2 | 5/2013 | Kornachuk et al. | |
| 8,490,110 B2 | 7/2013 | Hoover et al. | |
| 8,492,886 B2 | 7/2013 | Or-Bach et al. | |
| 8,514,889 B2 | 8/2013 | Jayasimha | |
| 8,541,819 B1 | 9/2013 | Or-Bach et al. | |
| 8,543,964 B2 | 9/2013 | Ge et al. | |
| 8,601,423 B1 | 12/2013 | Philip et al. | |
| 8,619,622 B2 | 12/2013 | Harrand et al. | |
| 8,635,577 B2 | 1/2014 | Kazda et al. | |
| 8,661,455 B2 | 2/2014 | Mejdrich et al. | |
| 8,667,439 B1 | 3/2014 | Kumar et al. | |
| 8,705,368 B1 | 4/2014 | Abts et al. | |
| 8,711,867 B2 | 4/2014 | Guo et al. | |
| 8,717,875 B2 | 5/2014 | Bejerano et al. | |
| 8,726,295 B2 | 5/2014 | Hoover et al. | |
| 8,738,860 B1 | 5/2014 | Griffin et al. | |
| 8,793,644 B2 | 7/2014 | Michel et al. | |
| 8,798,038 B2 | 8/2014 | Jayasimha et al. | |
| 8,819,611 B2 | 8/2014 | Philip et al. | |
| 2002/0071392 A1 | 6/2002 | Grover et al. | |
| 2002/0073380 A1 | 6/2002 | Cooke et al. | |
| 2002/0083159 A1 | 6/2002 | Ward et al. | |
| 2002/0095430 A1 | 7/2002 | Egilsson et al. | |
| 2003/0088602 A1 | 5/2003 | Dutta et al. | |
| 2003/0145314 A1 | 7/2003 | Nguyen et al. | |
| 2004/0049565 A1 | 3/2004 | Keller et al. | |
| 2004/0103218 A1 | 5/2004 | Blumrich et al. | |
| 2004/0216072 A1 | 10/2004 | Alpert et al. | |
| 2005/0147081 A1 * | 7/2005 | Acharya | H04L 45/22 370/351 |
| 2005/0203988 A1 | 9/2005 | Nollet et al. | |
| 2006/0002303 A1 * | 1/2006 | Bejerano | H04W 40/10 370/238 |
| 2006/0031615 A1 | 2/2006 | Bruce et al. | |
| 2006/0075169 A1 | 4/2006 | Harris et al. | |
| 2006/0161875 A1 | 7/2006 | Rhee | |
| 2006/0206297 A1 | 9/2006 | Ishiyama et al. | |
| 2006/0209846 A1 | 9/2006 | Clermidy et al. | |
| 2006/0268909 A1 | 11/2006 | Langevin et al. | |
| 2007/0038987 A1 | 2/2007 | Ohara et al. | |
| 2007/0088537 A1 | 4/2007 | Lertora et al. | |
| 2007/0118320 A1 | 5/2007 | Luo et al. | |
| 2007/0147379 A1 | 6/2007 | Lee et al. | |
| 2007/0162903 A1 | 7/2007 | Babb, II et al. | |
| 2007/0244676 A1 | 10/2007 | Shang et al. | |
| 2007/0256044 A1 | 11/2007 | Coryer et al. | |
| 2007/0267680 A1 | 11/2007 | Uchino et al. | |
| 2007/0274331 A1 | 11/2007 | Locatelli et al. | |
| 2008/0072182 A1 | 3/2008 | He et al. | |
| 2008/0120129 A1 | 5/2008 | Seubert et al. | |
| 2008/0126569 A1 | 5/2008 | Rhim et al. | |
| 2008/0184259 A1 | 7/2008 | Lesartre et al. | |
| 2008/0186998 A1 | 8/2008 | Rijpkema | |
| 2008/0211538 A1 | 9/2008 | Lajolo et al. | |
| 2008/0232387 A1 | 9/2008 | Rijpkema et al. | |
| 2009/0037888 A1 | 2/2009 | Tatsuoka et al. | |
| 2009/0046727 A1 | 2/2009 | Towles | |
| 2009/0070726 A1 | 3/2009 | Mehrotra et al. | |
| 2009/0122703 A1 | 5/2009 | Gangwal et al. | |
| 2009/0172304 A1 | 7/2009 | Gueron et al. | |
| 2009/0187716 A1 | 7/2009 | Comparan et al. | |
| 2009/0187756 A1 | 7/2009 | Nollet et al. | |
| 2009/0210184 A1 | 8/2009 | Medardoni et al. | |
| 2009/0231348 A1 | 9/2009 | Mejdrich et al. | |
| 2009/0268677 A1 * | 10/2009 | Chou | H04W 40/00 370/329 |
| 2009/0285222 A1 | 11/2009 | Hoover et al. | |
| 2009/0300292 A1 | 12/2009 | Fang et al. | |
| 2009/0307714 A1 | 12/2009 | Hoover et al. | |
| 2009/0313592 A1 | 12/2009 | Murali et al. | |
| 2010/0040162 A1 * | 2/2010 | Suehiro | H04L 5/0023 375/260 |
| 2010/0158005 A1 | 6/2010 | Mukhopadhyay et al. | |
| 2010/0211718 A1 | 8/2010 | Gratz et al. | |
| 2010/0223505 A1 | 9/2010 | Andreev et al. | |
| 2011/0022754 A1 | 1/2011 | Cidon et al. | |
| 2011/0035523 A1 | 2/2011 | Feero et al. | |
| 2011/0060831 A1 | 3/2011 | Ishii et al. | |
| 2011/0072407 A1 | 3/2011 | Keinert et al. | |
| 2011/0085550 A1 | 4/2011 | Lecler et al. | |
| 2011/0103799 A1 | 5/2011 | Shacham et al. | |
| 2011/0154282 A1 | 6/2011 | Chang et al. | |
| 2011/0191774 A1 | 8/2011 | Hsu et al. | |
| 2011/0235531 A1 | 9/2011 | Vangal et al. | |
| 2011/0276937 A1 | 11/2011 | Waller | |
| 2011/0302345 A1 | 12/2011 | Boucard et al. | |
| 2011/0307734 A1 | 12/2011 | Boesen et al. | |
| 2011/0320854 A1 | 12/2011 | Elrabaa | |

(56) References Cited

U.S. PATENT DOCUMENTS

| | | |
|---|---|---|
| 2012/0022841 A1 | 1/2012 | Appleyard |
| 2012/0023473 A1 | 1/2012 | Brown et al. |
| 2012/0026917 A1 | 2/2012 | Guo et al. |
| 2012/0079147 A1 | 3/2012 | Ishii et al. |
| 2012/0099475 A1 | 4/2012 | Tokuoka |
| 2012/0110106 A1 | 5/2012 | De Lescure et al. |
| 2012/0110541 A1 | 5/2012 | Ge et al. |
| 2012/0155250 A1 | 6/2012 | Carney et al. |
| 2012/0173846 A1 | 7/2012 | Wang et al. |
| 2012/0209944 A1 | 8/2012 | Mejdrich et al. |
| 2013/0028090 A1 | 1/2013 | Yamaguchi et al. |
| 2013/0028261 A1 | 1/2013 | Lee |
| 2013/0051397 A1* | 2/2013 | Guo .................. H04L 45/00 370/400 |
| 2013/0054811 A1 | 2/2013 | Harrand |
| 2013/0080073 A1 | 3/2013 | de Corral |
| 2013/0103369 A1 | 4/2013 | Huynh et al. |
| 2013/0103912 A1 | 4/2013 | Jones et al. |
| 2013/0117543 A1 | 5/2013 | Venkataramanan et al. |
| 2013/0148506 A1* | 6/2013 | Lea .................. H04L 47/32 370/236 |
| 2013/0151215 A1 | 6/2013 | Mustapha |
| 2013/0159944 A1 | 6/2013 | Uno et al. |
| 2013/0163615 A1 | 6/2013 | Mangano et al. |
| 2013/0174113 A1 | 7/2013 | Lecler et al. |
| 2013/0179613 A1 | 7/2013 | Boucard et al. |
| 2013/0179902 A1 | 7/2013 | Hoover et al. |
| 2013/0191572 A1 | 7/2013 | Nooney et al. |
| 2013/0207801 A1 | 8/2013 | Barnes |
| 2013/0219148 A1 | 8/2013 | Chen et al. |
| 2013/0250792 A1 | 9/2013 | Yoshida et al. |
| 2013/0254488 A1 | 9/2013 | Kaxiras et al. |
| 2013/0263068 A1 | 10/2013 | Cho et al. |
| 2013/0268990 A1 | 10/2013 | Urzi et al. |
| 2013/0326458 A1 | 12/2013 | Kazda et al. |
| 2014/0068132 A1 | 3/2014 | Philip et al. |
| 2014/0068134 A1 | 3/2014 | Philip et al. |
| 2014/0092740 A1 | 4/2014 | Wang et al. |
| 2014/0098683 A1 | 4/2014 | Kumar et al. |
| 2014/0112149 A1 | 4/2014 | Urzi et al. |
| 2014/0115218 A1 | 4/2014 | Philip et al. |
| 2014/0115298 A1 | 4/2014 | Philip et al. |
| 2014/0211622 A1 | 7/2014 | Kumar et al. |
| 2014/0254388 A1 | 9/2014 | Kumar et al. |
| 2015/0043575 A1 | 2/2015 | Kumar et al. |
| 2015/0109024 A1 | 4/2015 | Abdelfattah et al. |
| 2015/0159330 A1 | 6/2015 | Weisman et al. |

FOREIGN PATENT DOCUMENTS

| | | |
|---|---|---|
| JP | 6060316 B2 | 1/2017 |
| KR | 10-2013-0033898 A1 | 4/2013 |
| KR | 101652490 | 8/2016 |
| WO | 2010074872 A1 | 7/2010 |
| WO | 2013063484 A1 | 5/2013 |
| WO | 2014059024 A1 | 4/2014 |

OTHER PUBLICATIONS

Das, R., et al., Aergia: Exploiting Packet Latency Slack in On-Chip Networks, 37th International Symposium on Computer Architecture (ISCA '10), Jun. 19-23, 2010, 11 pgs.
Ebrahimi, E., et al., Fairness via Source Throttling: A Configurable and High-Performance Fairness Substrate for Multi-Core Memory Systems, ASPLOS '10, Mar. 13-17, 2010, 12 pgs.
Grot, B., Preemptive Virtual Clock: A Flexible, Efficient, and Cost-Effective QOS Scheme for Networks-on-Chip, Micro '09, Dec. 12-16, 2009, 12 pgs.
Grot, B., Kilo-NOC: A Heterogeneous Network-on-Chip Architecture for Scalability and Service Guarantees, ISCA '11, Jun. 4-8, 2011, 12 pgs.
Grot, B., Topology-Aware Quality-of-Service Support in Highly Integrated Chip Multiprocessors, 6th Annual Workshop on the Interaction between Operating Systems and Computer Architecture, Jun. 2006, 11 pgs.
Jiang, N., et al., Performance Implications of Age-Based Allocations in On-Chip Networks, CVA MEMO 129, May 24, 2011, 21 pgs.
Lee, J. W., et al., Globally-Synchronized Frames for Guaranteed Quality-of-Service in On-Chip Networks, 35th IEEE/ACM International Symposium on Computer Architecture (ISCA), Jun. 2008, 12 pgs.
Lee, M. M., et al., Approximating Age-Based Arbitration in On-Chip Networks, PACT '10, Sep. 11-15, 2010, 2 pgs.
Li, B., et al., CoQoS: Coordinating QoS-Aware Shared Resources in NoC-based SoCs, J. Parallel Distrib. Comput., 71 (5), May 2011, 14 pgs.
International Search Report and Written Opinion for PCT/US2013/064140, dated Jan. 22, 2014, 9 pgs.
International Search Report and Written Opinion for PCT/US2014/012003, dated Mar. 26, 2014, 9 pgs.
International Search Report and Written Opinion for PCT/US2014/012012, dated May 14, 2014, 9 pgs.
Ababei, C., et al., Achieving Network on Chip Fault Tolerance by Adaptive Remapping, Parallel & Distributed Processing, 2009, IEEE International Symposium, 4 pgs.
Beretta, I, et al., A Mapping Flow for Dynamically Reconfigurable Multi-Core System-on-Chip Design, IEEE Transactions on Computer-Aided Design of Integrated Circuits and Systems, Aug. 2011, 30(8), pp. 1211-1224.
Gindin, R., et al., NoC-Based FPGA: Architecture and Routing, Proceedings of the First International Symposium on Networks-on-Chip (NOCS'07), May 2007, pp. 253-262.
Yang, J., et al., Homogeneous NoC-based FPGA: The Foundation for Virtual FPGA, 10th IEEE International Conference on Computer and Information Technology (CIT 2010), Jun. 2010, pp. 62-67.
International Search Report and Written Opinion for PCT/US2014/023625, dated Jul. 10, 2014, 9 pgs.
International Search Report and Written Opinion for PCT/US2014/037902, dated Sep. 30, 2014, 14 pgs.
Bolotin, Evgency, et al., "QNoC: QoS Architecture and Design Process for Network on Chip" 2004, 24 pages, Journal of Systems Architecture 50 (2004) 105-128 Elsevier.
Hestness, J., et al., Netrace: Dependency-Tracking for Efficient Network-on-Chip Experimentation, The University of Texas at Austin, Dept. of Computer Science, May 2011, 20 pgs.
Lin, S., et al., Scalable Connection-Based Flow Control Scheme for Application-Specific Network-on-Chip, The Journal of China Universities of Posts and Telecommunications, Dec. 2011, 18(6), pp. 98-105.
Munirul, H.M., et al., Evaluation of Multiple-Valued Packet Multiplexing Scheme for Network-on-Chip Architecture, Proceedings of the 36th International Symposium on Multiple-Valued Logic (ISMVL '06), 2006, 6 pgs.
Zaman, Aanam, "Formal Verification of Circuit-Switched Network on Chip (NoC) Architectures using SPIN", Oosman Hasan, IEEE © 2014, 8 pages.
Office Action for Korean Patent Application No. 10-2016-7019093 dated Sep. 8, 2016, 3 pages plus 1 page English translation. KIPO, Korea.
Notice of Allowance for for Korean Patent Application No. 10-2016-7019093 dated Dec. 5, 2016, 5 pages. KIPO, Korea.
Office Action for Japanese Patent Application No. 2015-535898 dated Oct. 25, 2016, 2 pages English, 2 pages untranslated copy. Japan Patent Office.
Notice of Grant for Japanese Patent Application No. 2015-535898 dated Jan. 17, 2017, 3 pages, untranslated. Japan Patent Office.
Decision to Grant for Japanese Patent Application No. 2016-513030 dated Nov. 22, 2016, 3 pages, untranslated, Japan Patent Office.
Office Action for Japanese Patent Application No. 2016-513030 dated Aug. 30, 2016, 2 pages, Japan Patent Office.
International Search Report and Written Opinion for PCT/US2014/060886, dated Jan. 26, 2015, 10 pgs.

(56) References Cited

OTHER PUBLICATIONS

International Search Report and Written Opinion for PCT/US2014/060892, dated Jan. 27, 2015, 10 pgs.
International Search Report and Written Opinion for PCT/US2014/060879, dated Jan. 21, 2015, 10 pgs.
International Search Report and Written Opinion for PCT/US2014/060745, dated Jan. 21, 2015, 10 pgs.
International Search Report and Written Opinion for PCT/US2014/048190, dated Nov. 28, 2014, 11 pgs.

* cited by examiner

HETEROGENEOUS CHANNEL CAPACITIES IN AN INTERCONNECT

CROSS-REFERENCE TO RELATED APPLICATION(S)

This application claims the benefit of U.S. application Ser. No. 13/647,557, filed Oct. 9, 2012, the disclosure of which is hereby incorporated by reference.

BACKGROUND

Technical Field

Methods and example embodiments described herein are generally directed to interconnect architecture, and more specifically, to network on chip system interconnect architecture.

Related Art

The number of components on a chip is rapidly growing due to increasing levels of integration, system complexity and shrinking transistor geometry. Complex System-on-Chips (SoCs) may involve a variety of components e.g., processor cores, DSPs, hardware accelerators, memory and I/O, while Chip Multi-Processors (CMPs) may involve a large number of homogenous processor cores, memory and I/O subsystems. In both systems the on-chip interconnect plays a key role in providing high-performance communication between the various components. Due to scalability limitations of traditional buses and crossbar based interconnects, Network-on-Chip (NoC) has emerged as a paradigm to interconnect a large number of components on the chip.

NoC is a global shared communication infrastructure made up of several routing nodes interconnected with each other using point-to-point physical links. Messages are injected by the source component and are routed from the source components to the destination over multiple intermediate nodes and physical links. The destination component then ejects the message and provides it to the destination component. For the remainder of the document, terms 'components', 'blocks' hosts' or 'cores' will be used interchangeably to refer to the various system components which are interconnected using a NoC. Terms 'routers' and 'nodes' will also be used interchangeably. Without loss of generalization, the system with multiple interconnected components will itself be referred to as 'multi-core system'.

There are several possible topologies in which the routers can connect to one another to create the system network. Bi-directional rings (as shown in FIG. 1(a)) and 2-D mesh (as shown in FIG. 1(b)) are examples of topologies in the related art.

Packets are message transport units for intercommunication between various components. Routing involves identifying a path which is a set of routers and physical links of the network over which packets are sent from a source to a destination. Components are connected to one or multiple ports of one or multiple routers; with each such port having a unique ID. Packets carry the destination's router and port ID for use by the intermediate routers to route the packet to the destination component.

Examples of routing techniques include deterministic routing, which involves choosing the same path from A to B for every packet. This form of routing is oblivious of the state of the network and does not load balance across path diversities which might exist in the underlying network. However, such deterministic routing may be simple to implement in hardware, maintains packet ordering and may be easy to make free of network level deadlocks. Shortest path routing minimizes the latency as it reduces the number of hops from the source to destination. For this reason, the shortest path is also the lowest power path for communication between the two components. Dimension-order routing is a form of deterministic shortest path routing in 2D mesh networks.

FIG. 2 illustrates an example of XY routing in a two dimensional mesh. More specifically, FIG. 2 illustrates XY routing from node '34' to node '00'. In the example of FIG. 2, each component is connected to only one port of one router. A packet is first routed in the X dimension till the packet reaches node '04' where the x dimension is same as destination. The packet is next routed in the Y dimension until the packet reaches the destination node.

Source routing and routing using tables are other routing options used in NoC. Adaptive routing can dynamically change the path taken between two points on the network based on the state of the network. This form of routing may be complex to analyze and implement and is therefore rarely used in practice.

A NoC may contain multiple physical networks. Over each physical network, there may exist multiple virtual networks, wherein different message types are transmitted over different virtual networks. In this case, at each physical link or channel, there are multiple virtual channels; each virtual channel may have dedicated buffers at both end points. In any given clock cycle, only one virtual channel can transmit data on the physical channel.

NoC interconnects often employ wormhole routing, wherein, a large message or packet is broken into small pieces known as flits (also referred to as flow control digits). The first flit is the header flit which holds information about this packet's route and key message level info along with payload data and sets up the routing behavior for all subsequent flits associated with the message. Zero or more body flits follows the head flit, containing the remaining payload of data. The final flit is tail flit which in addition to containing the last payload also performs some bookkeeping to close the connection for the message. In wormhole flow control, virtual channels are often implemented.

The physical channels are time sliced into a number of independent logical channels called virtual channels (VCs). VCs provide multiple independent paths to route packets, however they are time-multiplexed on the physical channels. A virtual channel holds the state needed to coordinate the handling of the flits of a packet over a channel. At a minimum, this state identifies the output channel of the current node for the next hop of the route and the state of the virtual channel (idle, waiting for resources, or active). The virtual channel may also include pointers to the flits of the packet that are buffered on the current node and the number of flit buffers available on the next node.

The term "wormhole" plays on the way messages are transmitted over the channels: the output port at the next router can be so short that received data can be translated in the head flit before the full message arrives. This allows the router to quickly set up the route upon arrival of the head flit and then opt out from the rest of the conversation. Since a message is transmitted flit by flit, the message may occupy several flit buffers along its path at different routers, creating a worm-like image.

Based upon the traffic between various end points, and the routes and physical networks that are used for various messages, different physical channels of the NoC interconnect may experience different levels of load and congestion. The capacity of various physical channels of a NoC interconnect is determined by the width of the channel (number of physical wires) and the clock frequency at which it is operating. Various channels of the NoC may operate at different clock frequencies. However, all channels are equal in width or number of physical wires. This width can be determined based on the most loaded channel and the clock frequency of various channels.

SUMMARY

Aspects of the example implementations may include a method, involving determining and/or adjusting a width for each of a plurality of channels in a network on chip (NoC) based on at least one performance objective for the each of the plurality of channels or a maximum data flow of the each of the plurality of channels, such that at least one of the plurality of channels has a different width than at least another one of the plurality of channels.

Additional aspects of the example implementations may further include a computer readable storage medium storing instructions for executing a process, involving determining and/or adjusting a width for each of a plurality of channels in a network on chip (NoC) based on at least one performance objective for the each of the plurality of channels or a maximum data flow of the each of the plurality of channels, such that at least one of the plurality of channels has a different width than at least another one of the plurality of channels.

Additional aspects of the example implementations may further include a system, which includes a width adjustment module configured to determine and/or adjust a width for each of a plurality of channels in a network on chip (NoC) based on at least one performance objective for the each of the plurality of channels or a maximum data flow of the each of the plurality of channels, such that at least one of the plurality of channels has a different width than at least another one of the plurality of channels.

DETAILED DESCRIPTION

Complex traffic profiles in a SoC can create uneven load on various channels of the interconnect that connects various components of the SoC. Example embodiments described herein are based on the concept of constructing interconnect with heterogeneous channel capacities (number of wires) for a specified inter-block communication pattern in the system. An example process of the automatic construction of the NoC interconnect is also disclosed.

The load on various channels of NoC interconnect depends upon the rate at which various components are sending messages, the topology of the NoC interconnect, how various components are connected to the NoC nodes, and the path various messages are taking in the NoC. Channels may be uniformly sized in number of wires across the entire NoC to avoid the reformatting of messages within the NoC nodes as they travel over various channels. In such cases case, to avoid congestion, all channels may be sized based on the most loaded channel in the NoC. Load balancing of channels can be performed by routing messages over less loaded paths, which reduces the non-uniform loading of various channels and therefore the maximum load. However, there is limited flexibility in choosing different paths. Route paths can have a variety of restrictions such as using shortest path, using minimal turn, or lack of path diversity between various components. Therefore, in most SoCs, channels remain non-uniformly loaded, and using the highest channel load to determine the global NoC channel width leads to increased area, power and interconnect cost.

Unlike related art systems, NoC interconnects that use homogeneous channel width in number of wires, example implementations disclosed herein are directed to an interconnect design in which various channels may have a different number of wires, leading to non-uniform channel width and/or bandwidth capacities. The channel bandwidth requirement can be determined by computing the maximum data bandwidth that is expected on the channel, based on the traffic profile. If some channels have different width based on their bandwidth requirements, various nodes within the NoC may have to reformat messages as messages traverse between two channels of different widths. A single message flit may need to be sub-divided into multiple smaller flits, or multiple message flits may need to be merged together to form a larger message flit. For example, a single 128-bit flit coming on a 128-bit input channel may have to be broken into two flits of 64-bit each as it goes from a 128-bit channel to 64-bit channel.

Figure 1A:
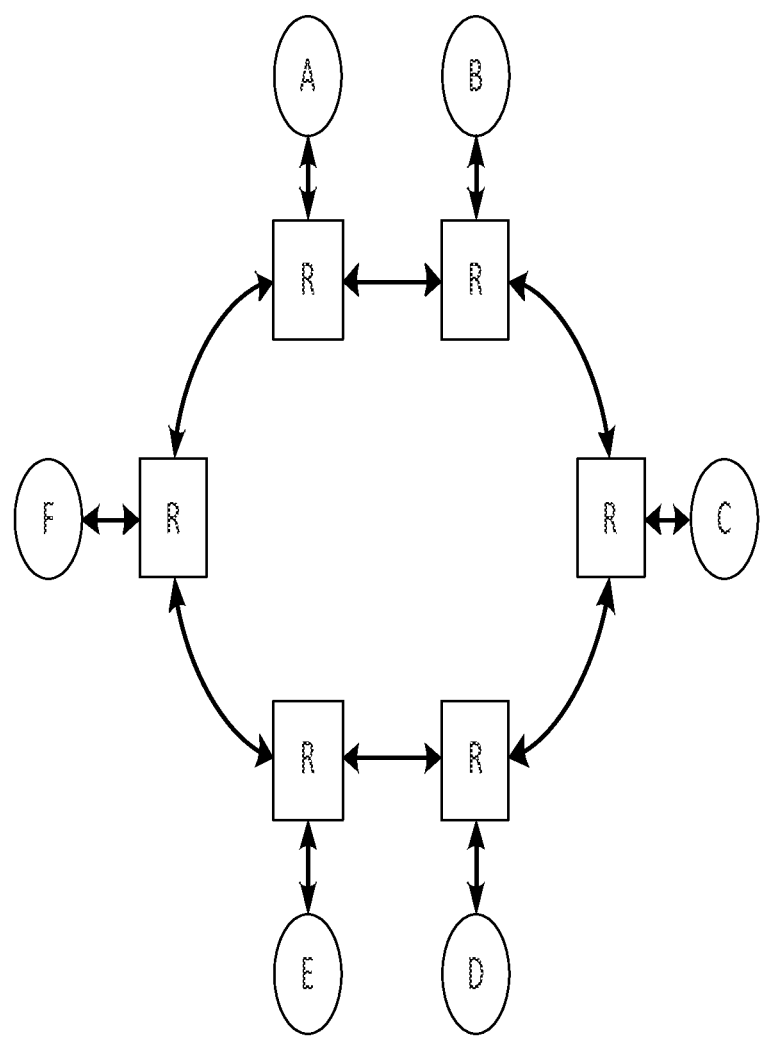
FIGS. 1(a) and 1(b) illustrate examples of Bidirectional ring and 2D Mesh NoC Topologies.
Figure 1B:
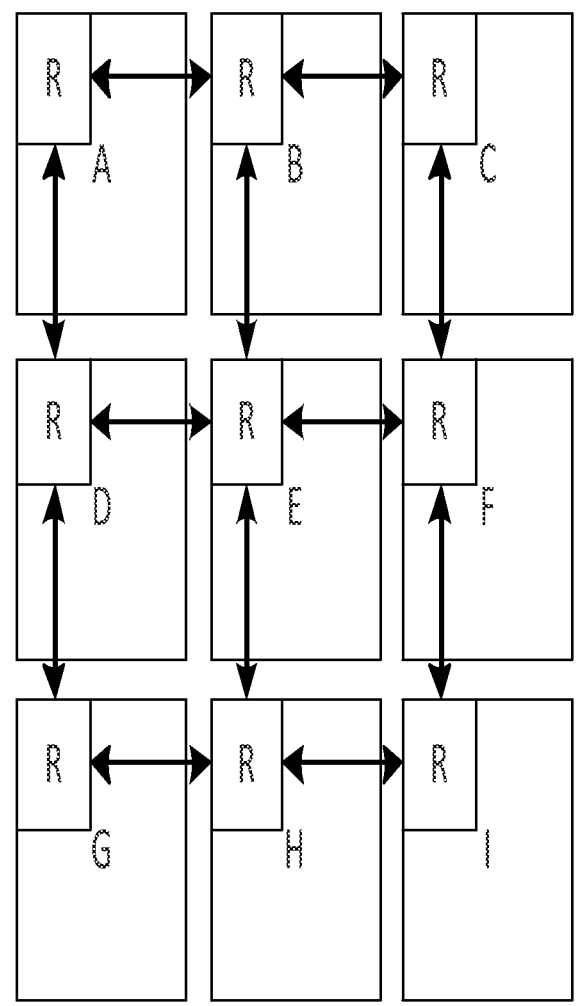
Figure 2:
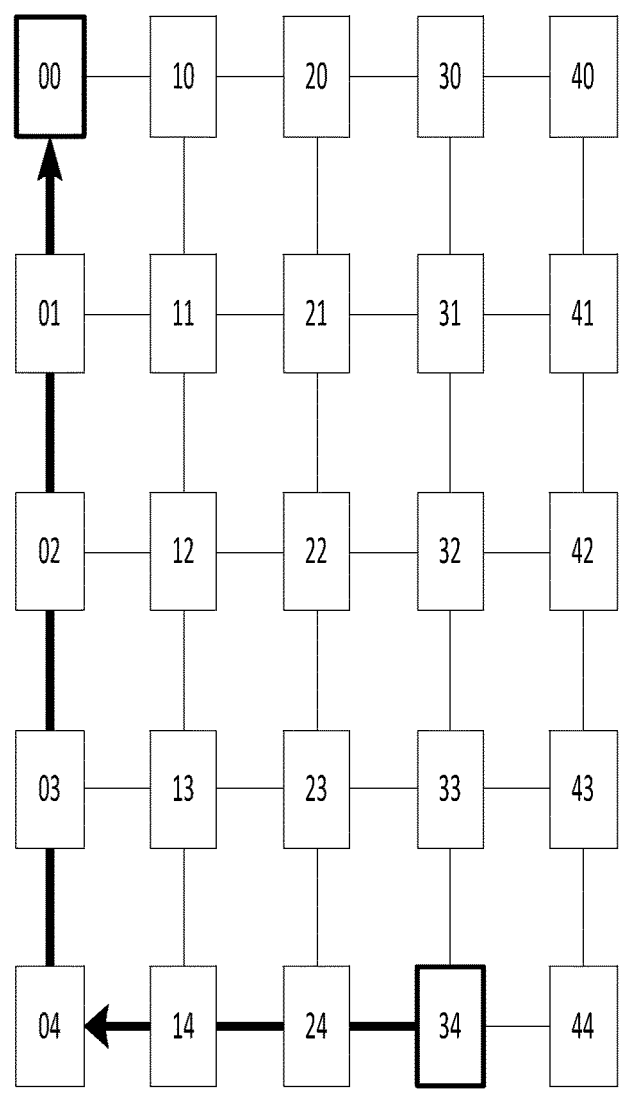
FIG. 2 illustrates an example of XY routing in a related art two dimensional mesh.
Figure 3A:
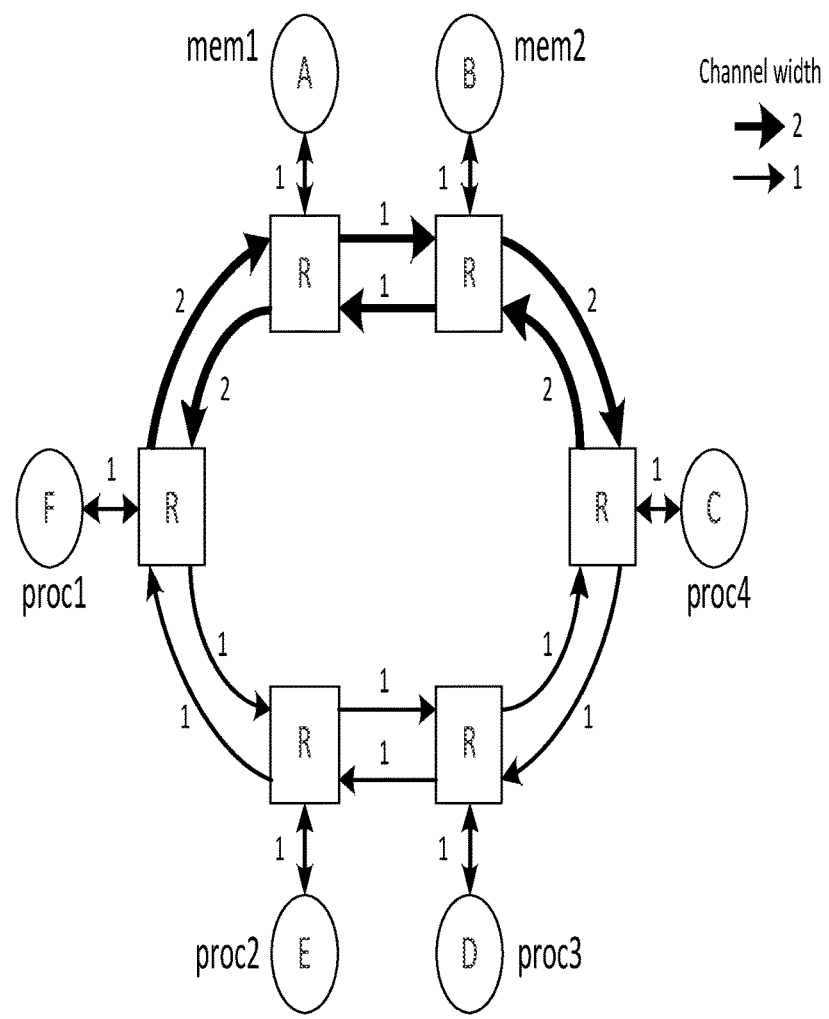
FIGS. 3(a) and 3(b) illustrates an example of a ring and 2D mesh NoC with asymmetric channel widths/sizes as indicated by the link widths, in accordance with an example implementation.
Figure 3B:
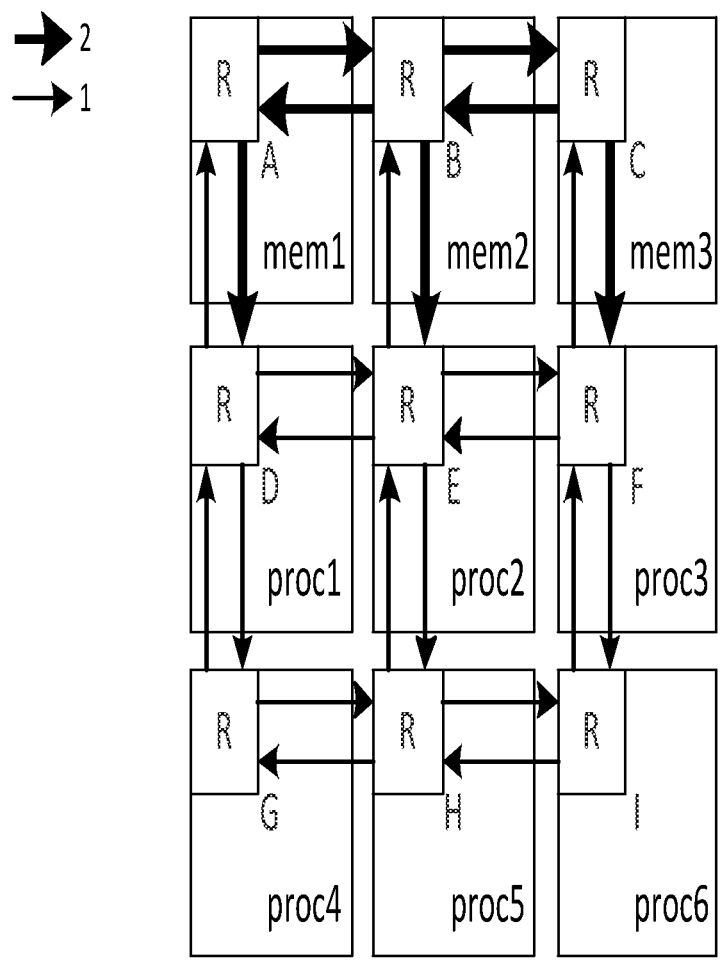

An example of such a heterogeneous channel NoC interconnect is shown in FIGS. 3(a) and 3(b). FIG. 3(a) shows a 6-node ring interconnect with heterogeneous channel widths, in accordance with an example implementation. The four processor components, proc1, proc2, proc3, and proc4 are connected to the two memory components mem1 and mem2. The channels in this interconnect are of two widths, 64-bit (1 unit) and 128-bit (2 units). Routers connecting components A, B, C and F to the NoC have various input and output channels of different width as shown and they may need to reformat the messages as they travel across channels of different width. FIG. 3(b) shows a 9-node mesh interconnect organized in a 3×3 topology, in accordance with an example implementation. Here 6 processors proc1, ... proc6 are connected to 3 memory components mem1, ... mem3, and the routers connected to components A, B, C, D, E, and F have channels of unequal widths.

Figure 4:
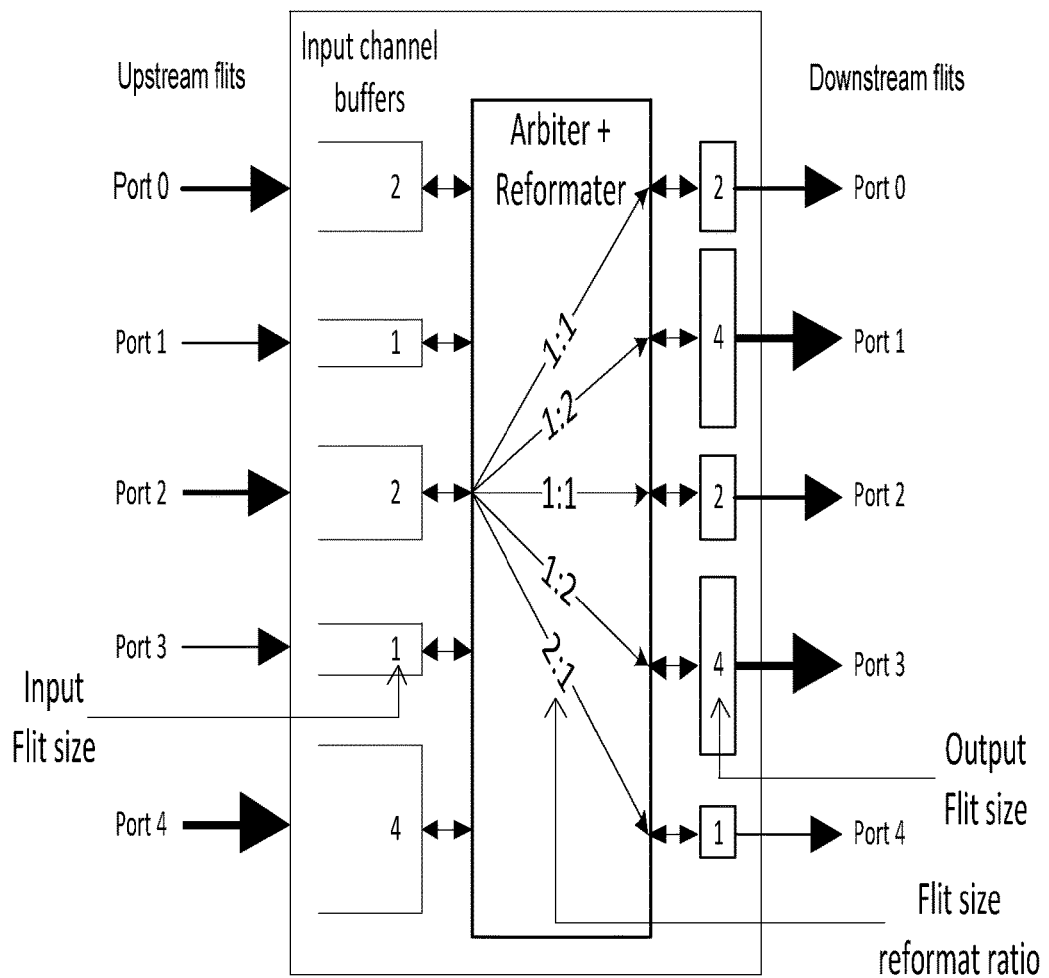
FIG. 4 illustrates an example of router architecture with asymmetric input and output channel widths, in accordance with an example implementation.

FIG. 4 shows the architecture of a 5-port router that has various input and output channels of different width, in accordance with an example implementation. In the example of FIG. 4, the channel width and the corresponding buffer widths are indicated by the width of the link, which varies from 64-bit (1 unit) to 256-bit (4 units). The flit reformatting is performed based upon the input and output channel widths. For example, when a 128-bit (2 units) flit arrives on a 128-bit channel and is written into the 128-bit buffer, the flit can be transmitted to either a 64-bit, 128-bit or 256-bit output channel, as illustrated in the diagram. The router node reformats the message accordingly by dividing a large flit into multiple smaller flits, or combining multiple flits of a single message into a single larger flit based upon the input and output channel widths. In the example of FIG. 4, reformatting is performed within a single message, and not across multiple messages. However, reformatting of multiple messages coming from same source and going to the same destination may also be performed. Depending upon the message arrival pattern, such opportunities may become rare in a large network.

In such a NoC with heterogeneous channel widths, the message reformatting that occurs within the NoC nodes is kept transparent from the end components. Thus, if the destination host is expecting messages of 128-bit flits, then the NoC is maintained such that after several segmentation and reassembly operations along the route, the message is delivered as 128-bit flits to the final destination. Therefore, the channels are sized so that all end-to-end channel widths from end host perspective remain consistent to the original homogeneous interconnect. For example, between a pair of 128-bit transmitting and receiving hosts, the interconnect may reduce the channel to 64-bit or smaller along the route, and increases back to 128-bit at the egress transmit channel of the router at the final destination host.

Figure 5:
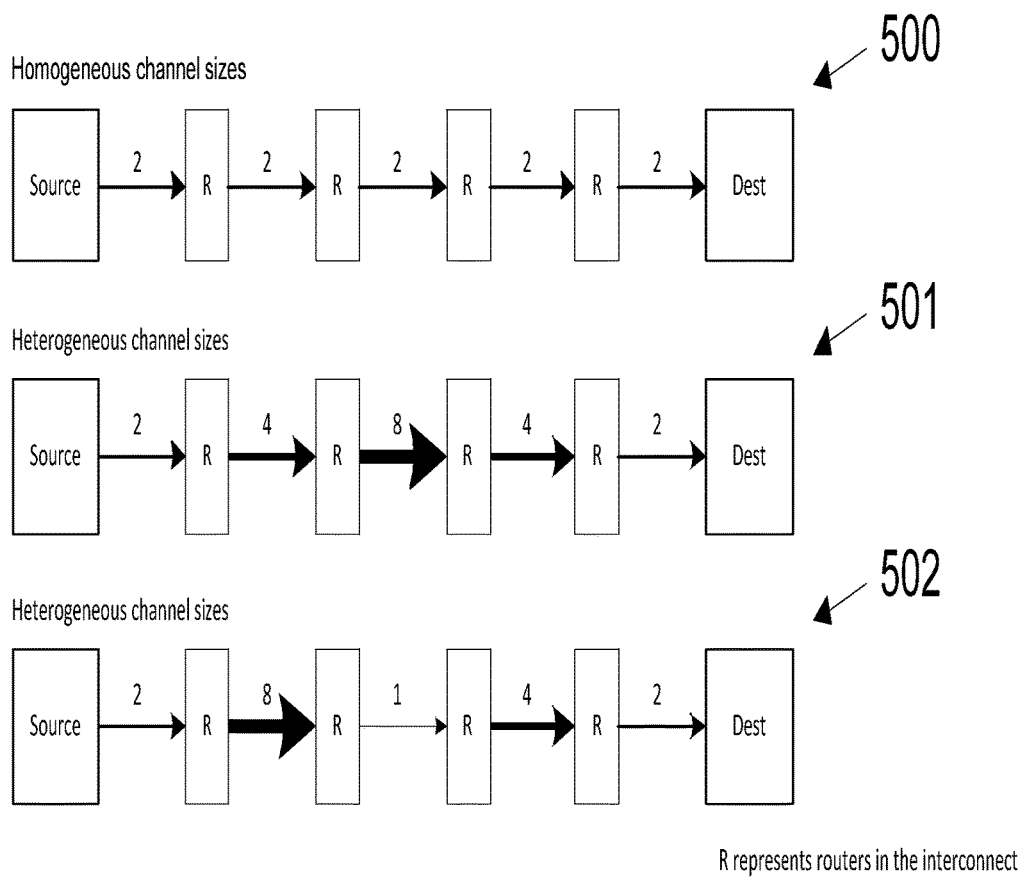
FIG. 5 illustrates an example of a communication sequence from a source node to the destination node with various combinations of channel widths along the path, in accordance with an example implementation.

A few examples of such consistent channel width conversion are shown in FIG. 5, in accordance with an example implementation. Path 500 shows a path with the homogeneous 128-bit (2 units) channel widths between source and destination components. Path 501 shows the path between the hosts wherein the channel width is kept the same at the end hosts. However along the path, the channel width is first increased from 2 units at the source to 4 units, then to 8 units and then reduced back to 4 units and then to 2 units at the destination. In path 502, the channel width along the paths are increased from 2 units at the source to 8 units, then reduced to 1 unit, then increased to 4 units and then reduced back to 2 units at the destination. While the channel widths are heterogeneous within the NoC, the end-to-end channel width between all communicating host pairs may need to remain consistent.

The end-to-end channel width consistency is maintained even when source and destination hosts have different transmit and receive channel widths. For example when a 64-bit transmit channel host sends message to 128-bit receive channel hosts, the message upon delivery is made to be 128-bit flits, even if the message is up- and down-converted along the route.

The width of various channels in the NoC may be determined not only by the bandwidth requirements of all messages traversing over the channel, but also by the latency requirements. Making a channel wider, thus allocating higher channel bandwidth, may not necessarily increase the throughput if channels are already wider than average data rate needed. However, making the channel wider may reduce the latency under a non-uniform traffic distribution. The minimum channel width may thereby be determined as at least equal to the data throughput of all flows that go over the channel.

To determine the minimum width of a channel, all source and destination pairs are listed whose messages are transmitted over the channel. The user may provide the data rates of all these messages to allow the system to size the channel by adding the data rates of all messages. If the data rates of the messages are not provided, and the data transmit and receive rates of all components are known, alternate implementations may be utilized to determine the minimum channel width (or maximum sustained data rate) in a complex system with complex traffic profile.

For example, consider four processors and two memories and shared memory computer environment, in which any processor can talk to any memory. Assume that the peak transmit rate of the processors is 64-bit/second and peak receive rate of the memories is 64-bit/second. In such an environment, a processor can send some fraction of the data to one memory and the remaining fraction to the other, or can entirely communicate with just one memory. Depending upon the communication pattern, a processor can transmit at a 64-bit/second rate.

Therefore, with four processors a NoC with 256-bit/sec peak channel throughput may be designed. However, in this example, the aggregate rate of communication can never exceed 128-bit/second, which is the aggregate receive capacity of the two memories. The load on various channels also depends upon the interconnect topology, routes, and the connection locations of the various components.

Assume the four processors and two memories are connected using a bi-directional ring, as shown in FIG. 3(*a*). Between the two routes available, assume the shortest route is always selected, breaking ties by choosing the clockwise route. Regardless of which processor talks to which combination of memories in which fraction in this example, the peak load on the channels between routers connected to components C and D, D and E, E and F will never exceed 64-bit/second (1 unit). Furthermore, there will be a communication pattern for which the channels between components F and A, A and B, B and C will experience load of 128-bit/second (2 units).

In a more complex system and communication pattern, it may become challenging to determine the peak data rate on various channels, for the minimum needed channel width may be computed. Described below is process which can be used to determine the peak data rate at any given channel of the NoC interconnect, in accordance with an example implementation.

Figure 6:
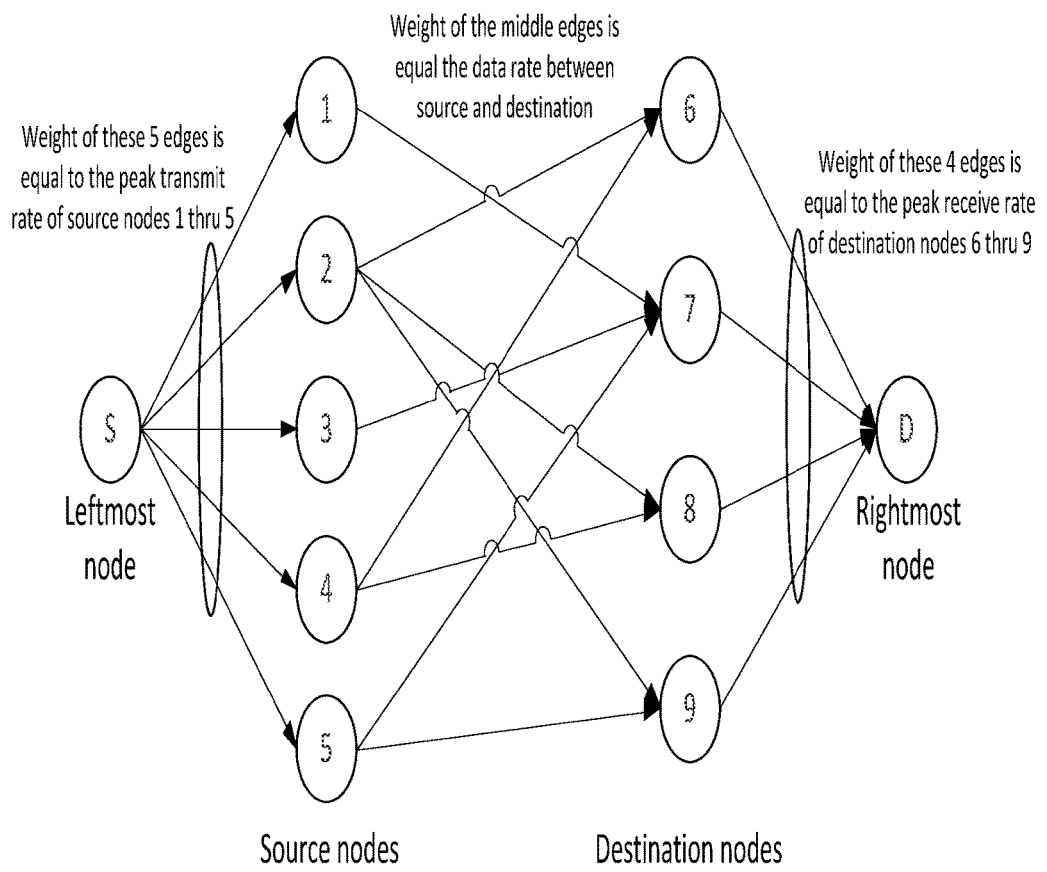
FIG. 6 illustrates an example of the flow graph constructed to determine the maximum traffic over a channel which will determine the width of the channel, in accordance with an example implementation.

All pairs of components which send messages over a channel are used to construct a directed flow or bipartite graph which involves of all source components on the left hand side and the destination components on the right hand side. Then, the source and destination components are connected with directional edges. The capacity of an edge is the maximum rate at which the source components can send data to the destination components along this route. The capacity cannot exceed the peak transmit rate of the source and peak receive rate of the destination. Subsequently two more components are added to the graph, one at the far left as S and one at the far right as D in the graph. The leftmost component is then connected to the list of source components on the left with directed edges, one for each source components. The capacity of these edges is the peak transmit rate of the source components. The list of destination components on the right are then connected to the rightmost edge with directed edges, one from each destination component. The capacity of these edges is the peak receive rate of the destination components. FIG. 6 shows such a graph for some channel, assuming that 5 sources transmit messages to 4 destinations as shown by the middle edges over the channel.

Figure 7:
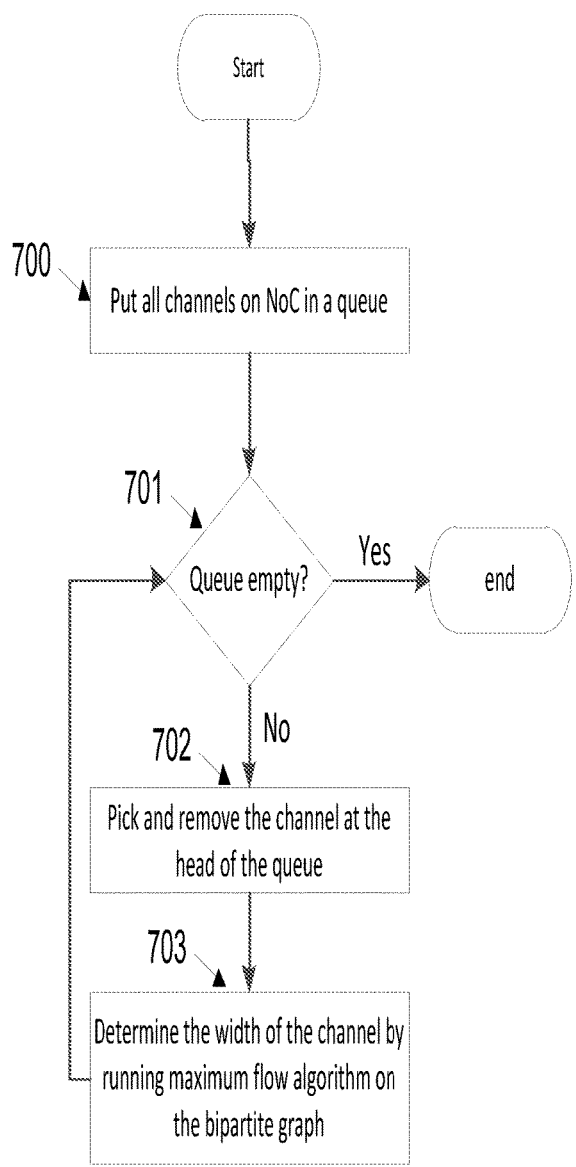
FIG. 7 illustrates a flowchart for determining channel widths in a heterogeneous NoC, in accordance with an example implementation.

Once such a directed flow graph is constructed for the given channel, the flow diagram of FIG. 7 can be utilized to determine the width of each channel. At 700, the channels of the NoC are placed in a queue. At 701, a check is conducted to see if the queue is empty. If the queue is empty then the procedure ends. If the queue is not empty, the procedure proceeds to 702 to pick and remove the channel at the head of the queue. Based on the selected channel, the maximum flow is computed from component S of the bi-partite graph to component D at 703. Graph algorithms in the related art may be utilized for computing the maximum flow in directed flow graphs. The maximum data load on the channel will not exceed the maximum flow. The channel can then be sized accordingly to ensure that the channel has enough bandwidth regardless of the traffic distribution. The channel width may be further increased to reduce latency, or the channel width reduced, e.g., to save cost, depending on the specified performance objective. This procedure is then repeated for every channel in the NoC.

Figure 8:
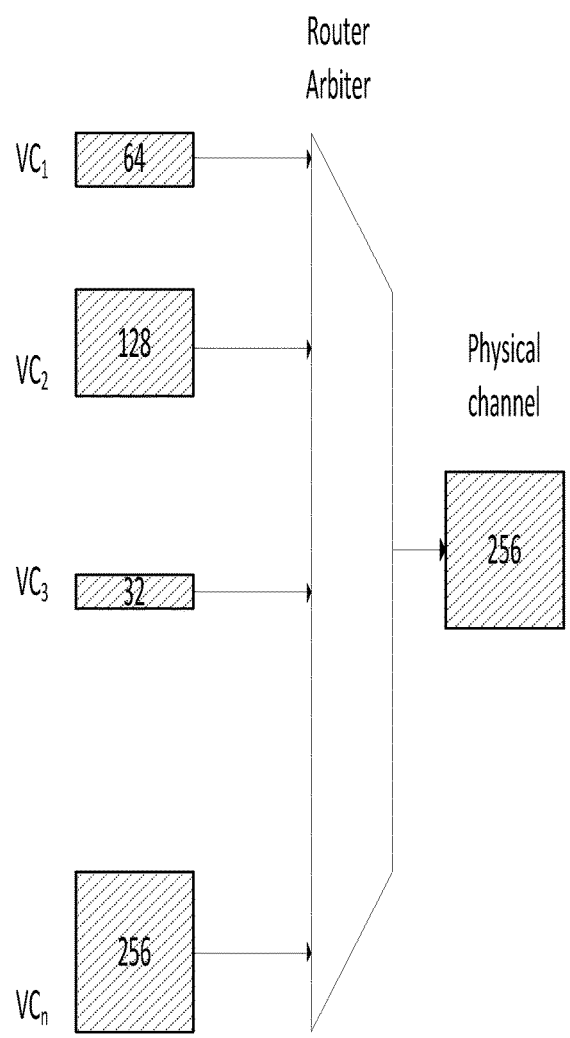
FIG. 8 illustrates an example implementation of a NoC with physical and virtual channels, in accordance with an example implementation.

In an interconnect that contains both virtual and physical channels, different virtual channels can be sized differently; while the physical channel width will be same as the width of the widest virtual channel. An example implementation of such as system is shown in FIG. 8, In the example of FIG. 8, multiple virtual channels at the input are contending for the output physical channel via router arbitration logic. Based upon the maximum flow graph analysis, the maximum bandwidth requirement of the various virtual channels can be obtained. However, the virtual channels may not be sized at this value if all of the virtual channels time shares with the physical channel, (e.g. a system where any single virtual channel will be sending data only for a fraction of time).

For example, if there are two virtual channels on a physical channel, and each virtual channel needs a minimum of 64 bits/cycle of bandwidth, then the virtual channels cannot be sized at 64-bits each. If they are sized as such, then each of the virtual channels will receive only 32-bits/cycle of bandwidth assuming that they share the physical channel equally. To ensure that both virtual channels at least 64-bit/cycle of data bandwidth, they need to be sized at 128-bits each (assuming that they share the physical channel equally).

If there are large numbers of virtual channels sharing a physical channel, and each virtual channel has a different minimum bandwidth requirement, then it is non-trivial to size the virtual channels so that all of them meet their bandwidth requirements. In an example implementation, the problem is mapped to standard linear optimization or linear programming problem. We can then utilize a standard linear programming solution to derive the virtual channel widths in such scenarios.

For example, assume that n virtual channels ($VC_1$, $VC_2$, ... $VC_n$) are sharing a physical channel, and their minimum bandwidth requirement is ($B_1$, $B_2$, ... $B_n$). Thus, the total bandwidth requirement at the physical channel is $\Sigma B_i$ for i=1 to n. Let $s_i$ indicate the width of $VC_i$. Clearly for all i=1 to n, si>$B_i$. The width of the physical channel is max(for i=1 to n, $s_i$). Assuming that VCi wins a $f_i$ fraction of times during arbitration, the bandwidth received by $VC_i$ is $f_i \times s_i$, which must be ≥Bi, the required bandwidth. Since all VCs share the physical channel $\Sigma f_i \leq 1$. Thus the following sets of linear constraints must be satisfied at all times:

$s_i \geq B_i$ for all i=1 to n.
$f_i \times s_i \geq Bi$ for all i=1 to n.
$0 \leq fi \leq 1$ for all i=1 to n.
$\Sigma f_i \leq 1$ for i=1 to n.

The buffer cost of the channel with virtual channel widths $s_i$ is $\Sigma s_i$. If the design goal is to minimize the buffer cost, then the objective function is to minimize $\Sigma s_i$. If the design goal is to minimize the number of wires, then the objective function max(for i=1 to n, $s_i$) can be minimized, which is the physical channel width. If the goals are different, then alternative objective functions may be constructed. At this point, a standard linear programming algorithm can be used to solve the problem and get the values of $s_i$, the width of various virtual channels that meets the constraints and minimizes/maximizes the objective function.

An example implementation therefore includes mapping the virtual and physical channel sizing problem to the standard linear programming optimization method, by listing of constraint inequalities, and constructing an objective function based upon the optimization goal.

Figure 9:
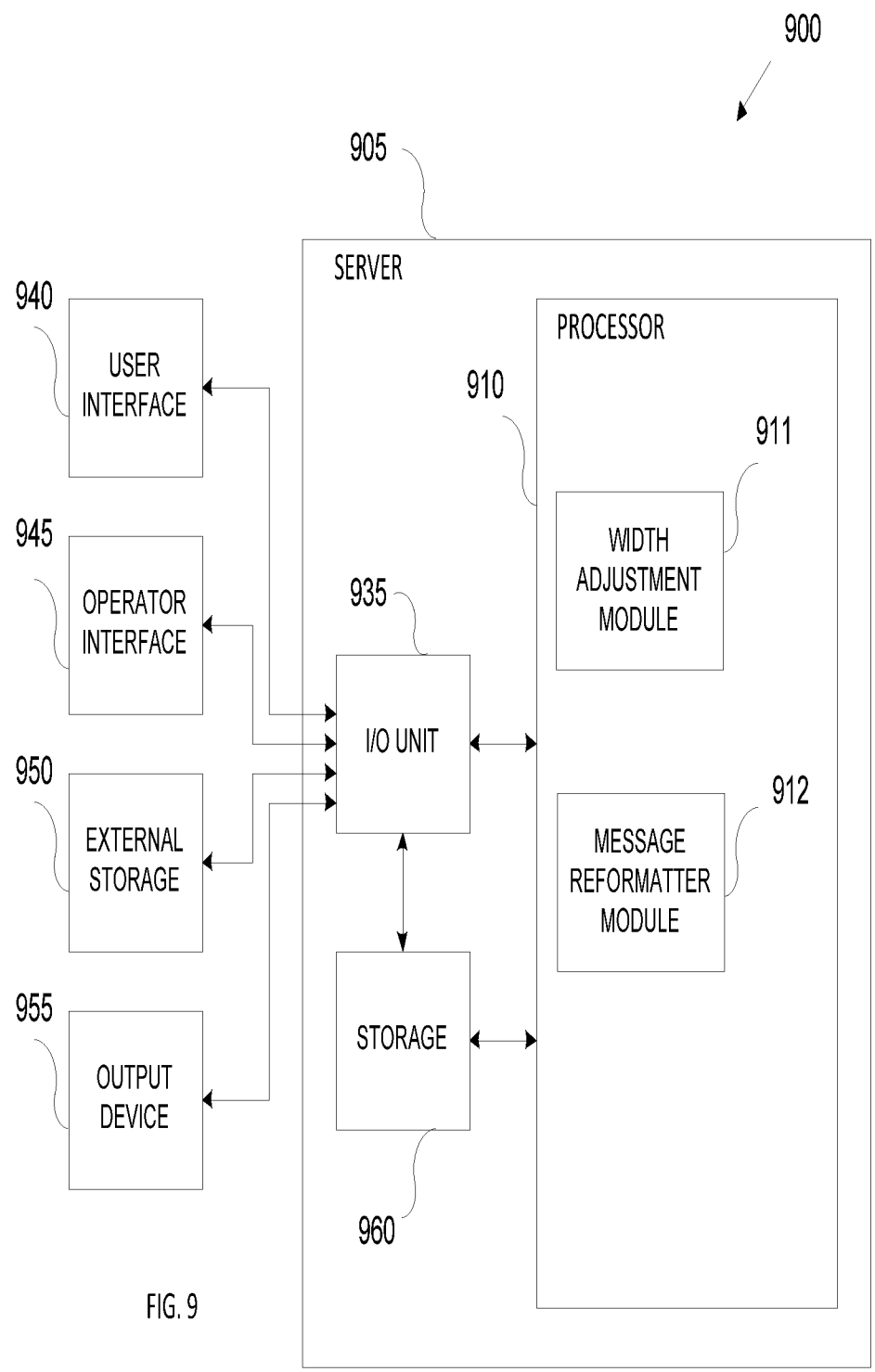
FIG. 9 illustrates a computer/server block diagram upon which the example implementations described herein may be implemented.

FIG. 9 illustrates an example computer system 900 on which example embodiments may be implemented. The computer system 900 includes a server 905 which may involve an I/O unit 935, storage 960, and a processor 910 operable to execute one or more units as known to one of skill in the art. The term "computer-readable medium" as used herein refers to any medium that participates in providing instructions to processor 910 for execution, which may come in the form of computer-readable storage mediums, such as, but not limited to optical disks, magnetic disks, read-only memories, random access memories, solid state devices and drives, or any other types of tangible media suitable for storing electronic information, or computer-readable signal mediums, which can include transitory media such as carrier waves. The I/O unit processes input from user interfaces 940 and operator interfaces 945 which may utilize input devices such as a keyboard, mouse, touch device, or verbal command.

The server 905 may also be connected to an external storage 950, which can contain removable storage such as a portable hard drive, optical media (CD or DVD), disk media or any other medium from which a computer can read executable code. The server may also be connected an output device 955, such as a display to output data and other information to a user, as well as request additional information from a user. The connections from the server 905 to the user interface 940, the operator interface 945, the external storage 950, and the output device 955 may via wireless protocols, such as the 802.11 standards, Bluetooth® or cellular protocols, or via physical transmission media, such as cables or fiber optics. The output device 955 may therefore further act as an input device for interacting with a user.

The processor 910 may execute one or more modules. The width adjustment module 911 is configured to determine and/or adjust a width for each of a plurality of channels in a network on chip (NoC) based on at least one performance objective for the each of the plurality of channels or a maximum flow of the each of the plurality of channels, such that at least one of the plurality of channels has a different width than at least another one of the plurality of channels. The width adjustment module 911 may be further configured to determine the maximum flow of the each of the plurality of channels from an application of a maximum flow algorithm on a graph of data traffic of the plurality of channels. The width adjustment module 911 may be further configured to determine the width of each of the plurality of channels by applying linear programming to determine the width that meet the at least one performance objective while minimizing at least one specified cost function, and to apply linear programming by constructing a list of constraints for meeting virtual and physical channel performance requirements. The width adjustment module may also be configured to determine at least one objective function for each of the at least one performance objective based on the list of constraints.

The message reformatter module 912 may be configured to construct a message reformatter between connected ones of the plurality of channels having differing widths, and to adjust flits of a message between the connected ones of the plurality of channels having differing widths. The message reformatter module 912 may also be configured to construct the message reformatters such that all source and destination end host pairs of the NoC maintain end-to-end message size and message format consistency.

Furthermore, some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the example embodiments, the steps carried out require physical manipulations of tangible quantities for achieving a tangible result.

Moreover, other implementations of the example embodiments will be apparent to those skilled in the art from consideration of the specification and practice of the example embodiments disclosed herein. Various aspects and/or components of the described example embodiments may be used singly or in any combination. It is intended that the specification and examples be considered as examples, with a true scope and spirit of the embodiments being indicated by the following claims.

What is claimed is:

1. A method, comprising:
    determining a width for each of a plurality of virtual channels in a network on chip (NoC) comprising a plurality of hosts interconnected by a plurality of physical wires to form the plurality of virtual channels, based on at least one NoC performance objective for the each of the plurality of virtual channels or a maximum data flow of the each of the plurality of virtual channels, such that at least one of the plurality of virtual channels has a different width than at least another one of the plurality of virtual channels, the at least one NoC performance objective comprising at least one of a bandwidth requirement and a latency requirement; and
    providing a message reformatter between connected ones of the plurality of virtual channels, wherein the provided message reformatter is configured to adjust flits of one or more messages between the connected ones of the plurality of virtual channels.

2. The method of claim 1, wherein the provided message reformatter is configured to adjust the one or more messages such that all source and destination end host pairs of the NoC maintain end-to-end message size and message format consistency.

3. The method of claim 1, wherein the maximum data flow of the each of the plurality of virtual channels is determined from an application of a maximum flow algorithm on a graph of data traffic of the plurality of virtual channels.

4. The method of claim 1, wherein the determining the width of each of the plurality of virtual channels further comprises applying linear programming to determine the width that meets the at least one NoC performance objective while minimizing at least one specified cost function.

5. The method of claim 4, wherein the applying linear programing further comprises constructing a list of constraints for meeting virtual and physical channel performance requirements, and wherein at least one objective function is derived for each of the at least one NoC performance objective based on the list of constraints.

6. The method of claim 1, wherein shortest path routing is applied to the plurality of virtual channels to meet the latency requirement.

7. A non-transitory computer readable medium storing instructions for executing a process, comprising:
    determining a width for each of a plurality of virtual channels in a network on chip (NoC) comprising a plurality of hosts interconnected by a plurality of physical wires to form the plurality of virtual channels, based on a maximum data flow of the each of the plurality of virtual channels, such that at least one of the plurality of virtual channels has a different width than at least another one of the plurality of virtual channels,
    wherein the instructions further comprise providing a message reformatter between connected ones of the plurality of virtual channels, wherein the provided message reformatter is configured to adjust flits of one or more messages between the connected ones of the plurality of virtual channels;
    wherein the maximum data flow of the each of the plurality of virtual channels is determined from an application of a maximum flow algorithm on a graph of data traffic of the plurality of virtual channels.

8. The non-transitory computer readable medium of claim 7, wherein the provided message reformatter is configured to adjust the one or more messages such that all source and destination end host pairs of the NoC maintain end-to-end message size and message format consistency.

9. The non-transitory computer readable medium of claim 7, wherein the maximum data flow is indicative of a maximum bandwidth required for the plurality of virtual channels.

10. The non-transitory computer readable medium of claim 7, wherein the determining the width of each of the plurality of virtual channels further comprises applying linear programming to determine the width that meets at least one NoC performance objective while minimizing at least one specified cost function.

11. The non-transitory computer readable medium of claim 10, wherein the applying linear programing further comprises constructing a list of constraints for meeting virtual and physical channel performance requirements, and wherein the instructions further comprise deriving at least one objective function for each of the at least one NoC performance objective based on the list of constraints.

12. The non-transitory computer readable medium of claim 10, wherein the at least one NoC performance objective comprises a latency requirement, and wherein the instructions further comprise applying shortest path routing to the plurality of virtual channels to meet the latency requirement.

13. A system, comprising:
    a width adjustment module configured to determine a width for each of a plurality of virtual channels in a network on chip (NoC) comprising a plurality of hosts interconnected by a plurality of physical wires to form the plurality of virtual channels, based on at least one NoC performance objective for the each of the plurality of virtual channels or a maximum data flow of the each of the plurality of virtual channels, such that at least one of the plurality of virtual channels has a different width than at least another one of the plurality of virtual channels, the at least one NoC performance objective comprising at least one of a bandwidth requirement and a latency requirement; and a message reformatter module configured to provide a message reformatter between connected ones of the plurality of virtual channels, wherein the provided message reformatter adjusts flits of one or more messages between the connected ones of the plurality of virtual channels.

14. The system of claim 13, wherein the provided message reformatter is configured to adjust one or more messages such that all source and destination end host pairs of the NoC maintain end-to-end message size and message format consistency.

15. The system of claim 13, wherein the maximum flow of the each of the plurality of virtual channels is determined by the width adjustment module from an application of a maximum flow algorithm on a graph of data traffic of the plurality of virtual channels.

16. The system of claim 13, wherein the width adjustment module is configured to determine the width of each of the plurality of virtual channels by applying linear programming to determine the width that meets the at least one NoC performance objective while minimizing at least one specified cost function.

17. The system of claim 16, wherein the width adjustment module is configured to apply linear programing by constructing a list of constraints for meeting virtual and physical channel performance requirements and further configured to derive at least one objective function for each of the at least one NoC performance objective based on the list of constraints.

* * * * *